(12) United States Patent
Biver et al.

(10) Patent No.: US 11,846,743 B2
(45) Date of Patent: Dec. 19, 2023

(54) ANALYZING A HYDROCARBON TRAP

(71) Applicant: Total SE, Courbevoie (FR)

(72) Inventors: Pierre Biver, Courbevoie (FR); Natalia Shchukina, Courbevoie (FR)

(73) Assignee: TOTAL SE, Courbevoie (FR)

( * ) Notice: Subject to any disclaimer, the term of this patent is extended or adjusted under 35 U.S.C. 154(b) by 197 days.

(21) Appl. No.: 17/333,321

(22) Filed: May 28, 2021

(65) Prior Publication Data

US 2021/0389497 A1  Dec. 16, 2021

(30) Foreign Application Priority Data

Jun. 15, 2020 (EP) ..................... 20305654

(51) Int. Cl.
*G01V 11/00* (2006.01)

(52) U.S. Cl.
CPC .................. *G01V 11/002* (2013.01)

(58) Field of Classification Search
None
See application file for complete search history.

(56) References Cited

U.S. PATENT DOCUMENTS

| | | | |
|---|---|---|---|
| 8,180,602 B2 | 5/2012 | Barboza et al. | |
| 8,437,997 B2 | 5/2013 | Meurer et al. | |
| 9,194,968 B2* | 11/2015 | Imhof | ........... G01V 1/30 |
| 9,874,648 B2 | 1/2018 | Braaksma et al. | |
| 2009/0299703 A1 | 12/2009 | Liu | |
| 2010/0252270 A1* | 10/2010 | Kim | ........... G01V 1/32 |
| | | | 702/12 |
| 2013/0338987 A1* | 12/2013 | Cheng | ........ G06F 30/20 |
| | | | 703/10 |
| 2015/0254567 A1 | 9/2015 | Imhof | |
| 2016/0377752 A1 | 12/2016 | Cavelius et al. | |
| 2019/0228121 A1* | 7/2019 | Fung | ........ G06F 30/20 |

FOREIGN PATENT DOCUMENTS

| | | |
|---|---|---|
| CN | 104375179 A | 2/2015 |
| CN | 104459783 A | 3/2015 |
| CN | 104952353 A | 9/2015 |

(Continued)

OTHER PUBLICATIONS

M0ll Nilsen Halvor et al: "Spill-point analysis and structural trapping capacity in saline aquifers usingMRST-co2lab", Computers & Geosciences, Pergamon, Amsterdam, NL, vol. 75, Nov. 7, 2014 (Nov. 7, 2014), pp. 33-43.

(Continued)

*Primary Examiner* — Lina Cordero
(74) *Attorney, Agent, or Firm* — Hamilton, Brook, Smith & Reynolds, P.C.

(57) ABSTRACT

The invention notably relates to a computer-implemented method for analyzing a hydrocarbon trap, for hydrocarbon production. The hydrocarbon trap has a top surface. The method comprises providing one or more geological meshes each representing the top surface. Each geological mesh has cells each representing a location on the top surface. The method further comprises for each geological mesh, determining one or more cells on the geological mesh. Each determined cell corresponds to a respective saddle of the trap.

14 Claims, 8 Drawing Sheets
(2 of 8 Drawing Sheet(s) Filed in Color)

(56) References Cited

FOREIGN PATENT DOCUMENTS

| CN | 107657365 A | 2/2018 | | |
|---|---|---|---|---|
| EP | 2235500 A1 | 10/2010 | | |
| WO | WO-2009079123 A1 | * | 6/2009 | ............ E21B 43/00 |
| WO | 2012102784 A1 | 8/2012 | | |
| WO | 2016187048 A1 | 11/2016 | | |
| WO | 2017123515 A1 | 7/2017 | | |

OTHER PUBLICATIONS

Extended European Search Report for Application No. 20305654.4, entitled "Analyzing A Hydrocarbon Trap," dated Dec. 4, 2020, 9 pages.

Abrahamsen, P., et al., "Uncertain Cap Rock Geometry, Spill Point, and Gross Rock Volume," Society of Petroleum Engineers International, SPE 49286:723-729, Sep. 27-30, 1998.

Abrahamsen, P., et al., Estimation of Gross Rock Volume of Filled Geological Structures With Uncertainty Measures, SPE Reservoir Eval. & Eng. 3 (4), Aug. 2000.

* cited by examiner

ANALYZING A HYDROCARBON TRAP

RELATED APPLICATION(S)

This application claims priority under 35 U.S.C. § 119 or 365 to Europe, Application No. 20305654.4, filed Jun. 15, 2020, the entire teachings of which are incorporated herein by reference.

FIELD OF THE INVENTION

The invention relates to the field of computer programs and systems, and more specifically to a method, system and program for analyzing a hydrocarbon trap.

BACKGROUND

Analyzing a hydrocarbon trap is gaining wide importance in hydrocarbon prospection and/or production processes. In many cases, the strategy of well implantation to discover an oil and/or gas reservoir and/or start production of an oil and/or gas reservoir depends on the knowledge of a hydrocarbon trap and of its characteristic points.

The following paper relates to this field: Peter Abrahamsen et al., Estimation of Gross Rock Volume of Filed Geological Structures with Uncertainty Measures, in SPE Reservoir Evaluation & Engineering 3(4):304-309, Ast 2000.

Existing methods for analyzing a hydrocarbon trap cannot handle hydrocarbon traps with multiple principal culminations.

Within this context, there is still a need for an improved method for analyzing a hydrocarbon trap.

SUMMARY

It is therefore provided a computer-implemented method for analyzing a hydrocarbon trap, for hydrocarbon production. The hydrocarbon trap has a top surface. The method comprises providing one or more geological meshes each representing the top surface. Each geological mesh has cells each representing a location on the top surface. The method further comprises for each geological mesh, determining one or more cells on the geological mesh. Each determined cell corresponds to a respective saddle of the trap.

The method may comprise one or more of the following:
  each geological mesh comprises depth values each at a cell and each representing a depth of the location represented by the cell, and wherein each determined cell corresponds to a local maximum of the depth values;
  determining the one or more cells comprises:
    providing two or more top cells on the geological mesh, each top cell representing a top of a respective culmination of the trap; and
    performing multiple propagations on the geological mesh, each propagation starting at a respective top cell and being performed according to a propagation criterion that rewards depth value smallness;
  each determined cell corresponds to an encounter between at least two propagations;
  each propagation is a spill-detection propagation;
  the providing of the two or more top cells comprises:
    providing two or more starting cells on the geological mesh, each starting cell representing a location within a respective culmination of the trap; and
    performing multiple initial propagations on the geological mesh, each initial propagation starting at a respective starting cell and being performed according to a propagation criterion that rewards depth value smallness;
  the determined one or more cells consists in at least two cells each corresponding to a respective saddle of the trap;
  each geological mesh stems from seismic measurements of the hydrocarbon trap;
  the provided one or more geological meshes comprise two or more geological meshes forming different representations of the top surface within a range of uncertainty;
  the method further comprises performing, based on one or more cells determined for at least one provided geological mesh, a segmentation of the trap into respective parts each associated with a respective culmination of the trap; and/or
  the method further comprises performing, based on one or more cells determined for at least one provided geological mesh, a fluid contact simulation.

It is further provided a computer program comprising instructions for performing the method.

It is further provided a computer readable storage medium having recorded thereon the computer program.

It is further provided a system comprising a processor coupled to a memory and a graphical user interface, the memory having recorded thereon the computer program.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The foregoing will be apparent from the following more particular description of example embodiments, as illustrated in the accompanying drawings in which like reference characters refer to the same parts throughout the different views. The drawings are not necessarily to scale, emphasis instead being placed upon illustrating embodiments.

Figure 1:
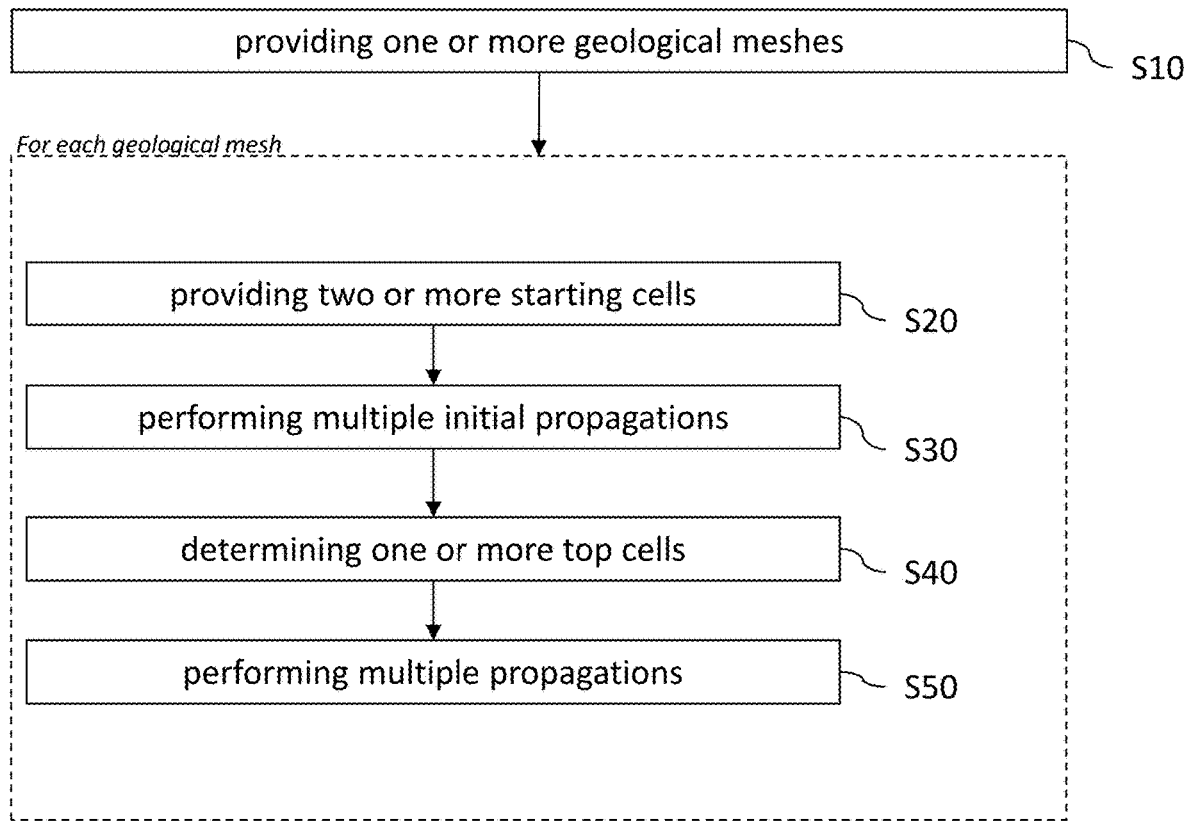

Embodiments of the invention will now be described, by way of non-limiting example, and in reference to the accompanying drawings, where:

FIG. 1 shows a flowchart of an example of the method; and

FIGS. 2 to 22 illustrate the method.

DETAILED DESCRIPTION

A description of example embodiments follows.

With reference to the flowchart of FIG. 1, it is provided a computer-implemented method for analyzing a hydrocarbon trap, for hydrocarbon production. The hydrocarbon trap has a top surface. The method comprises providing S10 one or more geological meshes each representing the top surface. Each geological mesh has cells each representing a location on the top surface. The method further comprises for each geological mesh, determining one or more cells on the geological mesh. Each determined cell corresponds to a respective saddle of the trap.

Such a method constitutes an improved method for analyzing a hydrocarbon trap.

Notably, the method determines, for each respective one of one or more geological meshes each representing the top surface of the trap, one or more cells each corresponding to a respective saddle of the trap. This amounts to say that the method determines one or more saddles of the trap for each geological mesh and their respective locations (e.g. their positions and/or depths). A saddle is a characteristic point of the top surface of the hydrocarbon trap located between two culminations of the trap. The saddle indicates a delimitation between the two culminations. The saddle may correspond to a leak connection between two culminations of the trap. The leak connection between the two culminations is a location of the trap where the two culminations communicate and where oil and/or gas can leak from a culmination to the other.

In other words, a saddle is a characteristic point of the trap and forms objective physical information based on which culminations of the trap may be identified. This allows understanding of oil and/or gas leakage and/or oil and/or gas repartition among culminations of the trap. This eventually allows to take hydrocarbon prospection/exploration and/or production decisions. For example, one may decide to implant exploration wells and/or production wells, e.g. on local culmination tops of the trap, based on the knowledge of saddle locations provided by the method.

Furthermore, the saddle(s) determined by the method allow(s) to perform a segmentation of the trap into respective parts each associated with a respective culmination of the trap and/or to simulate fluid contacts each respective to a respective culmination of the trap. Eventually, this allows to have a better (e.g. more accurate) knowledge of the trap, e.g. of volumes of oil and/or gas within the trap. This knowledge eventually allows to take well implantation decisions, e.g. based on well performance estimations obtained from knowledge of the trap.

Furthermore, the method may determine one or more saddles for two or more geological meshes forming different representations of the top surface within a range of uncertainty. In other words, the two or more geological meshes may stem from the same geological (e.g. seismic) measurements of the trap and each correspond to a different realization/interpretation of the geological measurements. In yet other words, each respective one of the two or more meshes represent the same top surface of the same trap, but differently. These meshes all represent the top surface within a range of uncertainty that stems for the uncertainties of the geological measurements. Due to this range of uncertainty, saddles determined by the method may differ from one mesh to another. In other words, for a given saddle of the trap in the real world, the method may determine several cells each corresponding to the saddle for a respective geological mesh, and all with different locations in space. This amounts to say that the method determines, for each given saddle of the trap, different cells forming different representations of the saddle within a range of uncertainty. Eventually, this allows, by processing the different cells, to estimate with further accuracy and robustness the real-world location of the saddle, thanks to the algorithm for the accuracy and the taking into account of the uncertainty for the robustness.

The method may alternatively determine one or more saddles for a single geometrical mesh representing the top surface.

The method is for analyzing a hydrocarbon trap.

The hydrocarbon trap is a part of an oil and/or gas reservoir where hydrocarbon accumulates. The oil and/or gas reservoir is a part of the subsoil made of porous rocks through which liquids, such as water or oil and/or gas, can pass. The hydrocarbon trap comprises a top surface which is a geological surface/horizon. The top surface forms a watertight sparsely-permeable geological layer, which may be referred to as "a watertight cover". The hydrocarbon trap also comprises a base surface located beneath the top surface. The base surface is also a geological surface/horizon forming a watertight sparsely-permeable geological layer. Rocks comprised between the base surface and the top surface are porous and permeable, such that water, oil or gas may migrate through them. The top surface blocks the hydrocarbons and keep them from migrating further higher in the subsoil.

The hydrocarbon trap comprises a top, which is the point of the top surface having the smallest depth. The hydrocarbon trap also comprises a spill, which is the point of the top surface having the maximum depth at which hydrocarbons are trapped. The hydrocarbon trap also comprises at least two culminations, which may also be referred to as "pools". A culmination may be defined as a concave-downward part of the top surface. The part of the trap that is comprised between said concave-downward part of the top surface and the base surface may be referred to as "the part of the trap associated with the culmination" but may also be simply referred to as the culmination itself for the sake of conciseness. Two culminations are separated by a saddle, the region where the separation occurs having substantially the shape of a saddle. The saddle may correspond to a leak connection as previously discussed. The point of the culmination having the smallest depth is referred to as the local top respective to the culmination or simply the local top of the culmination.

Figure 2:
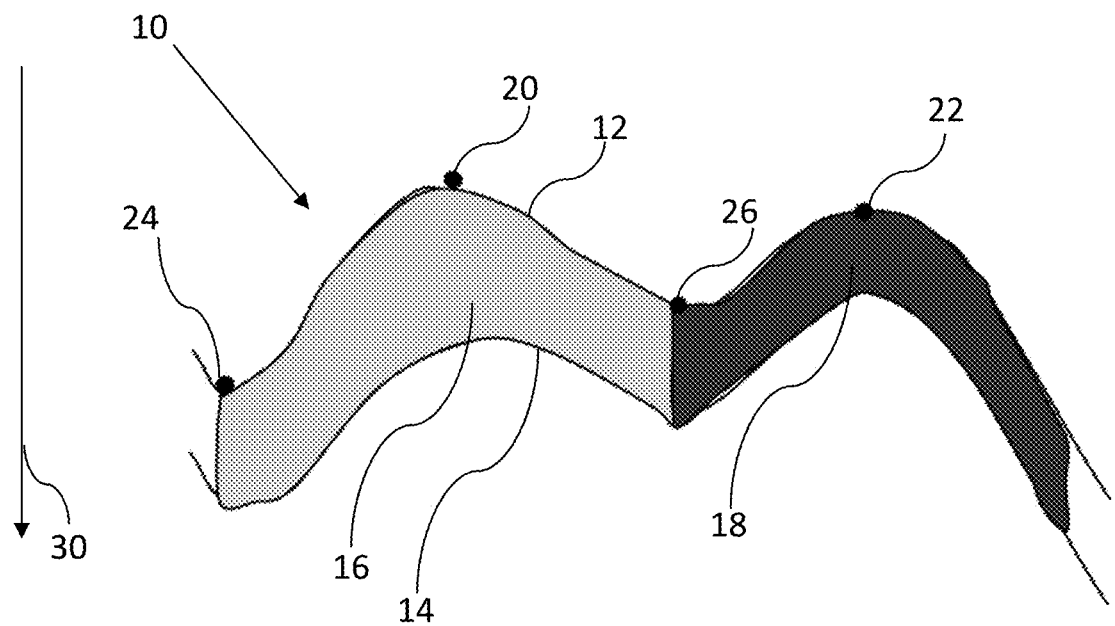
Figure 3:
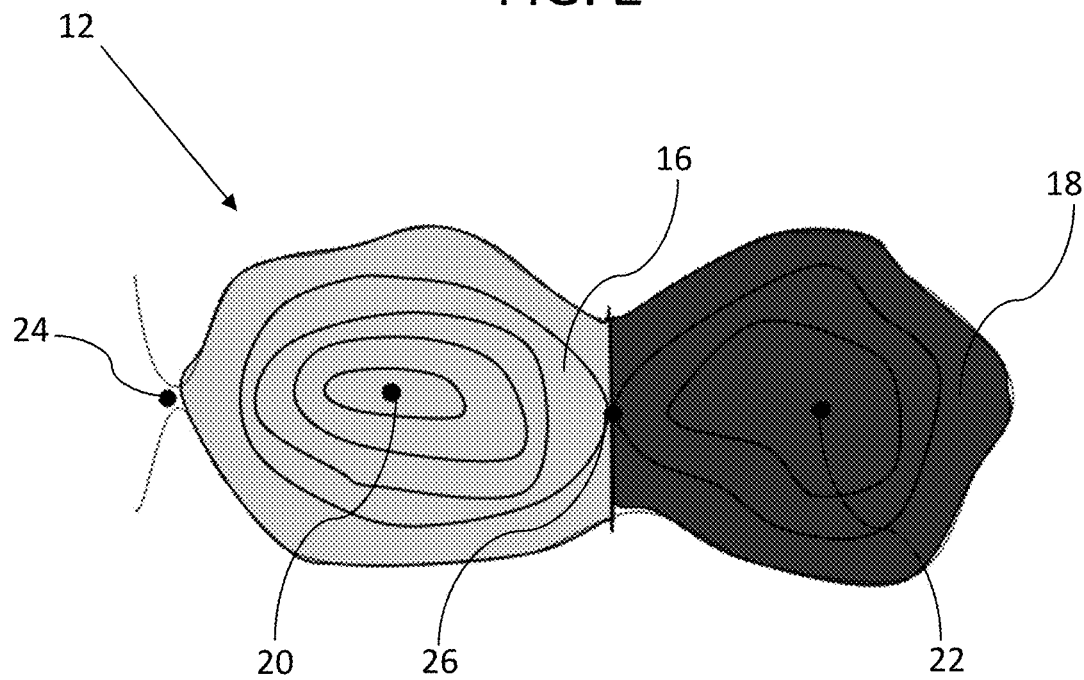
Figure 4:
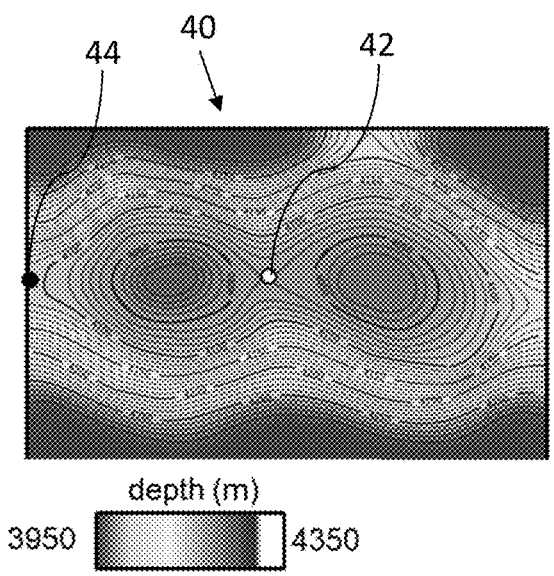
Figure 5:
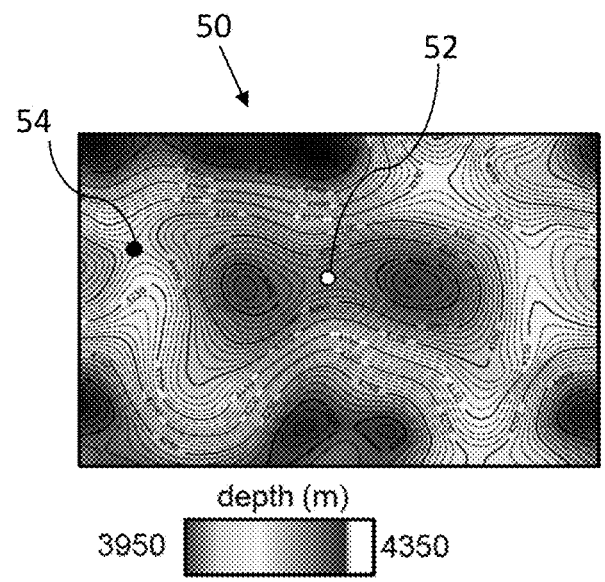
Figure 6:
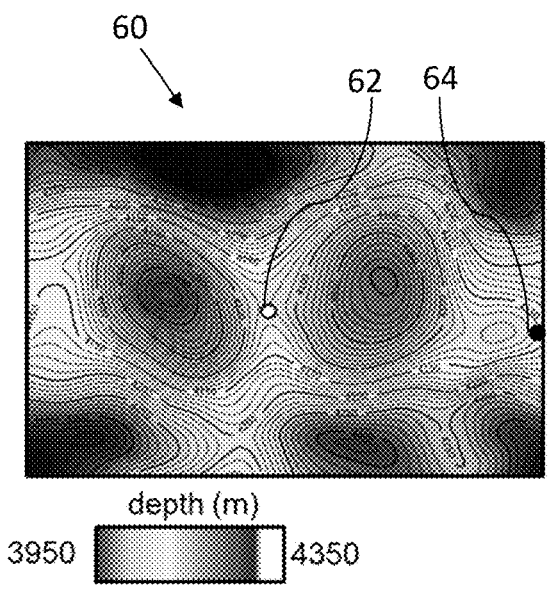
Figure 7:
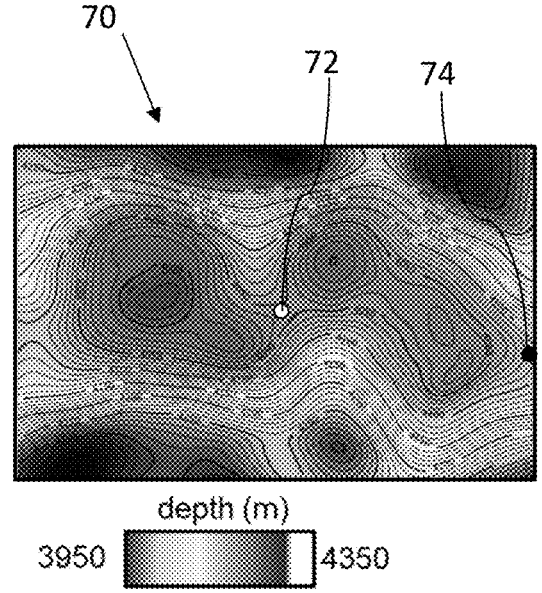
Figure 8:
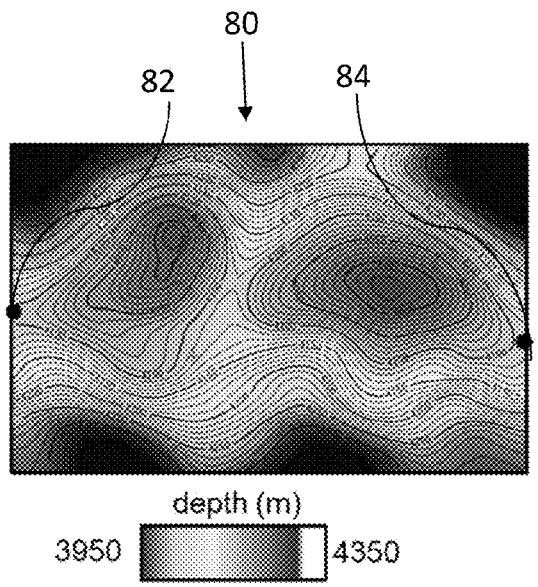
Figure 9:
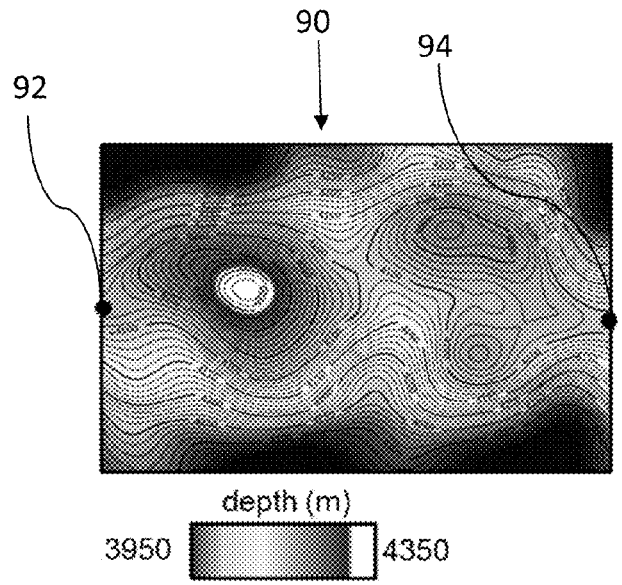

FIGS. 2 and 3 illustrate an example of a hydrocarbon trap 10. FIG. 2 shows a sectional view of the hydrocarbon trap 10 where the arrow 30 indicates the depth axis directed according to increasing depth. FIG. 3 shows a depth level curve map of the top surface 12 of the hydrocarbon trap 10. The trap 10 also comprises a base surface 14. The trap 10 comprises a spill 24. The trap 10 comprises a first culmination 16 having a local top 20 which is also the top of the trap 10. The trap 10 comprises a second culmination 18 having a local top 22. The culminations 16 and 18 meet at the saddle 26.

The method comprises providing S10 one or more geological mesh each representing the top surface. The one or more geological mesh may also be referred to as "one or more realizations of a geological mesh representing the top surface", each geological mesh being in this case possibly referred to as "a realization".

Each provided geological mesh is a computerized discrete geometrical representation of the top surface. The mesh is a 2D mesh which may conform to the shape of the top surface as it is in the real world. The mesh may be regular or irregular. The mesh comprises cells which each represent a location on the top surface. The mesh may be a 2D rectilinear mesh/grid, in which case the cells are 2D rectangular cells or square cells. Alternatively, the mesh may be a 2D triangular mesh, in which case the cells are triangles bounded by edges, themselves bounded by vertices. In examples, each provided geological mesh comprises depth values each at a cell. The depth value at a cell represents the depth of the location represented by the cell. In other words, the depth value is a value quantifying the depth of the location.

For each geological mesh, the providing S10 of the mesh may comprise designing the mesh. Alternatively, the providing S10 of the mesh may comprise retrieving the mesh from a (e.g. distant) memory where the mesh has been stored after its design, the mesh having been designed beforehand, that is before carrying out the method.

In examples, each geological mesh stems from seismic measurements of the hydrocarbon trap. This means that the mesh is obtained from seismic measurements of the hydrocarbon trap, e.g. performed during a seismic acquisition campaign. The providing S10 may comprise performing seismic measurements on a portion of the subsoil comprising the hydrocarbon trap, for example by performing a seismic acquisition campaign on the portion of the subsoil. As known per se from the field of geology, performing seismic measurements may comprise measuring responses of the portion of the subsoil to vibrations which are imposed to it, e.g. by operating one or more apparatuses configured for this purpose. In examples, the seismic measurements from which stems each geological mesh are provided with uncertainties when measured. In other words, the seismic measurements are provided within a range of uncertainty, for example based on accuracy limitations of apparatuses performing the measurements and/or based on noise during the performing of the measurements.

The providing S10 may additionally comprise designing each geological mesh based on the seismic measurements, e.g. by designing/determining a seismic grid/map of the portion of the subsoil based on the seismic measurements and then designing each geological mesh based on the seismic grid/map. Additionally or alternatively, designing the geological mesh may comprise identifying seismic reflectors based on the seismic measurements and defining the top surface based on identified seismic reflectors. The designing of each geological mesh may additionally of alternatively comprise performing one or more seismic simulations, e.g. based on the seismic measurements.

In examples, the provided one or more geological meshes comprise two or more geological meshes forming different representations of the top surface within a range of uncertainty. This means that each respective one of the two or more geological meshes represents the top surface, but that all these representations differ from one another within a range of uncertainty. In other words, each geological mesh forms a different representation of the top surface that is uncertain, but of which uncertainty is physically acceptable, i.e. the representation lies within the range of uncertainty. The range of uncertainty may also be referred to as "trust interval", as known per se from the field of geology. The range of uncertainty may correspond to a range of uncertainty of seismic measurements based on which the geological meshes have been designed.

FIGS. 4 to 9 illustrate the concept of "range of uncertainty" for two or more geological meshes. FIGS. 4 to 9 show depth level curve views of six realizations 40, 50, 60, 70, 80 and 90 of a geological mesh of a same top surface. The realizations are all different representations of the top surface and are all within a range of structural uncertainty, i.e. uncertainty relative to the structure of the top.

The method further comprises, for each geological mesh, determining one or more cells on the geological mesh. For example, the method may determine at least two cells each corresponding to a respective saddle of the trap. The determining is now discussed.

Each determined cell corresponds to a respective saddle of the trap. This means that the cell represents a location on the top surface that corresponds to a saddle. In examples, each geological mesh comprises depth values each at a cell and each representing a depth of the location represented by the cell. In these examples, each determined cell corresponds to a local maximum of depth values. In these examples, the determining may comprise, for each geological mesh, exploring cells of the mesh and searching for local maxima of depth values. It is to be noted that depth values are used as a convention, but the method could equivalently be performed using altitude values instead of depth values.

In examples, determining the one or more cells comprises providing two or more top cells on the geological mesh. Each top cell represents a top of a respective culmination of the trap. In these examples, determining the one or more cells comprises performing S50 multiple propagations on the geological mesh. Each propagation starts at a respective top cell and is performed according to a propagation criterion that rewards depth value smallness. Performing the multiple propagations is a simple and efficient manner of determining the one or more saddles. Moreover, the determining is thereby relatively cheap in terms of computing costs.

Providing the two or more top cells means that the two or more top cells are provided as inputs/starting cells to the multiple propagations. In fact, each propagation starts at a respective provided top cells. Providing the two or more top cells may comprise determining S40 the two or more top cells, as further discussed hereinafter. Alternatively, providing the two or more top cells may comprise retrieving the two or more top cells from a (e.g. distant) memory where they have been stored after having been computed, e.g. beforehand (i.e. before carrying out the method). Each top cell represents a top of a respective culmination of the trap, i.e. the top cell is a cell that represents a respective local top. This means that the location represented by the top cell corresponds to the respective local top.

The performing of multiple propagations is now discussed.

Each propagation is an algorithm that takes as input a respective top cell and that iteratively explores (i.e. visits) cells of the mesh. At each iteration, for a given currently explored cell, the propagation determines, among non-explored neighboring cells of previously explored cells, a cell that respects best a propagation criterion. The propagation criterion is a criterion that rewards depth value smallness. In other words, a cell respects best the propagation criterion, as compared to other cells, when this cell has the smallest depth value compared to the depth values of said other cells. In yet other words, the cell is the shallowest cell as compared to said other cells. In the context of the present disclosure, by "the neighboring cells of a cell", it is to be understood the cells forming a topological neighborhood of the cell. In examples where the mesh is a 2D rectilinear grid, the neighboring cells of a cell may be the eight cells topologically adjacent to the cell. In other examples where the mesh is a 2D rectilinear grid, the neighboring cells of a cell may consist in the four cells topologically adjacent to the cell and which each share an edge with the cell. In examples where the mesh is a 2D triangular mesh, the neighboring cells of a cell, which is triangle cell, are the triangle cells topologically adjacent to the cell. In the general case (for example, an unstructured mesh), the neighboring cells may be all those cells sharing an edge with the cell, or alternatively, all cells either sharing an edge or a vertex with the cell.

The multiple propagations thus start each at a respective top cell, which corresponds to a depth local minima (i.e. a local minima of the depth value) and each iteratively explore shallowest non-explored neighboring cells of previously explored cells. The method performs each propagation until the propagation encounters a border of the geological mesh or a spill of the trap, or, as discussed later, another propagation. The performing of the multiple propagations may comprise detecting one or more cells explored by the multiple propagations and that each correspond to a depth local maximum (i.e. a local maximum of the depth value). Such a cell represents a saddle, and the performing of the multiple propagations may then comprise outputting these one or more cells as the determined one or more cells each representing a saddle of the trap. It is to be understood that the method may perform the multiple propagations simultaneously.

In examples, the detecting of the one or more cells may comprise, for each propagation, storing in a list shallowest cells iteratively explored by the propagation. The determining of the one or more cells may comprise assessing a cell common to at least two lists for determining the one or more cells. Specifically, the detecting may comprise, for each propagation, once a cell is explored by the propagation, if the cells belongs to a list of cells explored by another propagation, determining the deepest cell of the two lists, i.e. the cell having the highest depth value among the cells of the two lists, as a cell representing a saddle of the trap. In other words, each determined cell may correspond to an encounter between at least two propagations, that is a deepest cells among two lists having a common cell. It is to be understood that the two propagations may be continued after this determination. In other words, along the performing of the multiple propagations, each time a cell corresponding to a saddle point is detected, the propagations for which the cell corresponds to an encounter may be carried on. In such a case, the performing of the multiple propagations may comprise merging the two propagations. Merging a first propagation with a second propagation may comprise stopping the first (resp. second) propagation, marking the cells (by merging the lists) explored by the first (resp. second) propagation as cells explored by the second (resp. first propagation), and then carrying on the second (resp. first) propagation, which is the propagation resulting from the merging. Eventually, the propagation resulting from the merging may encounter another propagation, in which case the merging may be repeated with this other propagation. If not, the determining of the one or more cells then comprises stopping the propagation resulting from the merging when the propagation encounters a border of the mesh or a spill of the trap.

In examples just discussed above, the determining may determine, besides the one or more cells each corresponding to a saddle, at least one other cell also corresponding to a depth local maximum. The at least one other cell may consist in a cell representing the spill of the trap, that is a cell having as depth value the depth value maximum (i.e. among the cells of the grid). Alternatively, the at least one other cell may further comprise at least one individual spill, which is the spill of a culmination. In examples, each propagation may be a spill-detection propagation, which is particularly efficient for determining/detecting spill(s). The spill-detection propagation may be any known spill-detection propagation method, such as the "Algorithm for Spill-Point Detection" disclosed in Peter Abrahamsen et al., Estimation of Gross Rock Volume of Filed Geological Structures with Uncertainty Measures, in SPE Reservoir Evaluation & Engineering 3(4):304-309, August 2000, which is incorporated herein by reference.

The providing of the two or more top cells is now further discussed.

In examples, the providing of two or more top cells comprises providing S20 two or more starting cells on the geological mesh. Each starting cell represents a location within a respective culmination of the trap. In these examples, the providing of two or more top cells further comprises performing S30 multiple initial propagations on the geological mesh. Each initial propagation starts at a respective starting cell and is performed according to a propagation criterion that rewards depth value smallness.

Providing S20 the two or more starting cells means that the two or more starting cells are provided as inputs/starting cells to the multiple initial propagations. In fact, each initial propagation starts at a respective provided starting cells. Providing S20 the two or more starting cells may be performed manually, that is by a user-machine interaction. For example, the user may select the two or more starting cells, e.g. after clicking on a "add cell" button. For example, the user may select the starting cells by graphical interaction such as clicking on the starting cells on a displayed representation of the mesh. Alternatively, the user may select the starting cells by providing their specifications, e.g. by using a keyboard. The number of starting cells may be unlimited (i.e., the user may select as many cells from the mesh as required), or alternatively, for controlling computational costs, limited (e.g. smaller or equal to 4), e.g. the system may offer to the user only a selection of a limited number of starting cells. Each starting cell represents any location on the top surface that is also part of a respective culmination of the trap.

The performing S30 of the multiple initial propagations is now discussed.

Each initial propagation is an algorithm that takes as input a respective starting cell and that iteratively explores cells of the mesh. At each iteration, for a given currently explored cell, the initial propagation determines, among non-explored neighboring cells of previously explored cells, a cell that respects best a propagation criterion. The propagation criterion is a criterion that rewards depth value smallness. In other words, a cell respects best the propagation criterion, as compared to other cells, when this cell has the smallest depth value compared to the depth values of said other cells.

The multiple initial propagations thus start each at a respective starting cell, and each iteratively explore shallowest non-explored neighboring cells of previously explored cells. Thus, each multiple initial propagation ultimately explores and finds a top cell, i.e. a cell corresponding to a depth value local minima is ultimately encountered. In other words, the method determines S40 each respective one of the one or more top cells each as a result of a respective initial propagation, e.g. based on the cells explored by the initial propagation. Each initial propagation may be any known top-detection propagation, and determining S40 each respective one of the one or more top cells each as a result of a respective initial propagations can be carried out by any suitable known method. In any case, the method determines S40 two or more local tops of the trap. The cells corresponding to the local tops are then provided as inputs for performing S50 the multiple propagations starting each at a respective top cell as previously discussed. Additionally, the method may output the cells determined as corresponding to local tops each of a culmination of the trap.

In examples, the performing S30 of the multiple initial propagations comprises, for each initial propagation:
  starting at the respective starting cell, iteratively exploring cells, the iterative exploring comprising, for each explored cell:
    collecting, among non-explored neighboring cells of the explored cell, a cell having a smallest depth value, and marking the other neighboring cells as explored;
    exploring next the collected cell.

In these examples, each propagation stops when the collected cell is lower than (i.e. has a higher depth value than) than the previously explored cell.

In these examples, each initial propagation thereby results in collected cells. In these examples, the method further comprises, for each initial propagation, determining S40 as a top cell a cell having the smallest depth value among the collected cells.

In examples, by performing the multiple initial propagations and then the multiple propagations starting each at a respective top cell, the method determines cells each corresponding to a characteristic point of the trap. These cells comprise, as previously discussed, the one or more cells each corresponding to a saddle of the trap and the two or more top cells each corresponding to a top of a respective culmination of the trap. As previously discussed, the method may also determine a cell corresponding to the spill of the trap and may additionally determine one or more individual spill(s). All these characteristic points allow to perform segmentation of the trap and/or to perform fluid contact simulation.

An algorithm implementing the determining of the one or more cells each corresponding to a respective saddle of the trap is now discussed. The algorithm implements steps S20 to S50 of the flowchart of FIG. 1.

The algorithm comprises providing S20 one or more starting cells, each being a cell of a respective culmination of the trap. The one or more starting cells may be provided by a user as previously discussed.

The algorithm comprises then performing multiple initial propagations S30, each starting cell, denoted P0, being the starting point of a respective initial propagation. Each initial propagation comprises, starting with the starting cell $P_0$, iteratively exploring cells, the iterative exploring comprising, for each explored cell $P_{n-1}$:
- assessing the neighboring cells of the explored cell $P_{n-1}$ and collecting, among these neighboring cells, the cell $P_{n-1}$ having the smallest depth value;
- determining whether the collected cell $P_n$ is higher than (i.e. has a smaller depth value than) the currently explored cell $P_{n-1}$. If the collected cell $P_n$ is higher than (i.e. has a smaller depth value than) the currently explored cell $P_{n-1}$, then the collected cell $P_n$ is the next explored cell. If not, the algorithm determines S40 the currently explored cell $P_{n-1}$ as a top cell and the iterative exploring stops.

The algorithm comprises then performing multiple spill detection propagations, each starting at a top cell, denoted $P_n$, determined at S40. Each spill detection propagation comprises, starting with the top cell $P_n$, iteratively exploring cells, the iterative exploring comprising, for each explored cell $P_n$:
- assessing the neighboring cells of the explored cell $P_n$ and adding them to a first list $L_1$;
- searching, in the first list $L_1$, the cell having the smallest depth value, adding this cell to a second list $L_2$ and removing this cell from the first list $L_1$. This cell is the next explored cell $P_n$.

The iterative exploring stops when an explored cell $P_n$ is a border cell of the geological mesh. The spill detection propagation then comprises determining the deepest cell (i.e. the cell having the highest depth value) of the second list $L_2$ as a spill. This cell may be referred to as "the deepest cell among the shallowest cells". This cell represents a spill which may be a local spill of the culmination to which the starting top cell $P_n$ belongs, or a global spill of the trap. The spill detection propagation further comprises storing as a third list $L_3$ all the cells of the second list $L_2$ that have been explored before the determined deepest cell.

The algorithm comprises then performing the multiple propagations S50, each starting at a top cell, denoted $P_n$, determined at S40. Each propagation comprises, starting with the top cell $P_n$, iteratively exploring cells, the iterative exploring comprising, for each explored cell $P_n$:
- assessing the neighboring cells of the explored cell $P_n$ and adding them to a first list $L_1$;
- searching, in the first list $L_1$, the cell having the smallest depth value, removing this cell from the first list $L_1$ and adding this cell to a second list $L_2$. This cell is the next explored cell $P_n$;
- determining whether this next explored cell $P_n$ already belongs to another second list $L_2$ corresponding to another propagation among said multiple propagations, and:
  - if the next explored cell $P_n$ belongs to another second list $L_2$ corresponding to another propagation among said multiple propagations, determining the deepest cell (i.e. the cell having the highest depth value) within the second list $L_2$ and the other second list $L_2$ as a cell corresponding to a saddle of the trap, and merging the propagation and the other propagation;
  - if the next explored cell $P_n$ does not belong to another second list $L_2$ corresponding to another propagation among said multiple propagations, exploring next this cell $P_n$.

The iterative exploring stops when an explored cell $P_n$ is a border cell of the geological mesh or is a cell corresponding to a spill determined by one of the multiple spill detection propagations. The performing of the multiple propagations carries on until all propagation have stopped.

The algorithm may comprise a further step of computing multiple pool maps, which yields a respective map for each respective pool (or culmination) of the trap. The computing of the pool maps uses each third list $L_3$ stored when performing the multiple spill detection propagations. The computing of the pool maps comprises, for each cell of the geological mesh:
- if the cell belongs to only one third list $L_3$, associating this cell to the pool associated with the third list $L_3$ (i.e. the pool of which top cell is the starting point of the spill detection propagation that yielded the third list $L_3$);
- if the cell does not belong to any third list $L_3$, this cell is not associated to any pool;
- if the cell belongs to several third lists $L_3$, executing a front propagation algorithm to associate this cell to one of the pools.

The front propagation algorithm may be a fast marching algorithm, as known in the art of propagation algorithms. The front propagation algorithm is executed for each pool and starts from all cells associated to a single pool, and, at each iteration, explores the currently non-explored neighboring cells of these cells. The front propagation algorithm associates these cells to said single pool, and so on, for each pool, until all the cells of the mesh are explored. Thereby, two cells belonging to several pools are, as the result of the front propagation algorithm, now associated to a single pool. When two front propagations (i.e. for two pools) reach the same cell, this cell is associated randomly to one of the two pools.

In an implementation, the algorithm may flag the cells relatively to all the connecting pools and list all possible cases for these cells. For example, the algorithm may update different properties in the mesh, e.g. a property for each starting cell which equals −99 when a cell is not explored, which equals 1 when it is explored and belongs to the corresponding pool, and which equals 0 when it is explored but does not belong to the pool. The update may be made once a saddle/leak or a spill is reached. If, for two different starting cells, the property equals 1 for a same cell, then there is a leak between the corresponding pools. The spills and leaks may be stored, e.g. for later use in fluid contact simulation and volume computation.

As previously said, in examples, the provided one or more geological meshes comprise two or more geological meshes forming different representations of the top surface within a range of uncertainty. In these examples, the method may determine, for each respective one of one or more saddle of the trap in the real world, two or more cells each of a respective geological mesh and each being a different representation of the respective saddle. These examples are now discussed.

Because each geological mesh forms a different and uncertain representation of the top surface, the location of each saddle as represented on the geological meshes may also be uncertain and may vary from one mesh to another. Thereby the method may determine different cells each belonging to a respective geological mesh and each being an uncertain and different representation of a same saddle. This is illustrated on FIGS. 4 to 7, where different saddles 42, 52, 62 and 72 are determined respectively for the realizations 40, 50, 60 and 70.

Similarly, the method may determine different cells each belonging to a respective geological mesh and each being an uncertain and different representation of a same characteristic point of the top surface, such as a spill, a local top, a top or an individual spill. This is illustrated on FIGS. 4 to 7, where different spills 44, 54, 64 and 74 are determined respectively for the realizations 40, 50, 60 and 70. This is also illustrated on FIGS. 8 and 9, where different individual spills 82 and 84, and 92 and 94, are determined respectively for the realizations 80 and 90.

Figure 10:
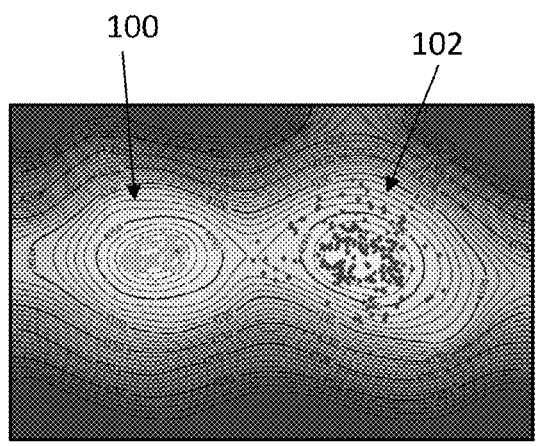
Figure 11:
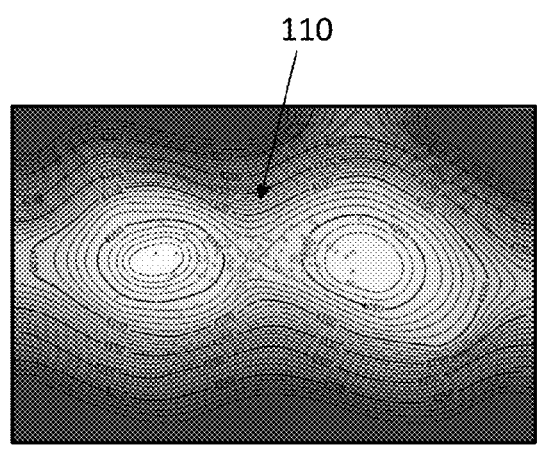
Figure 12:
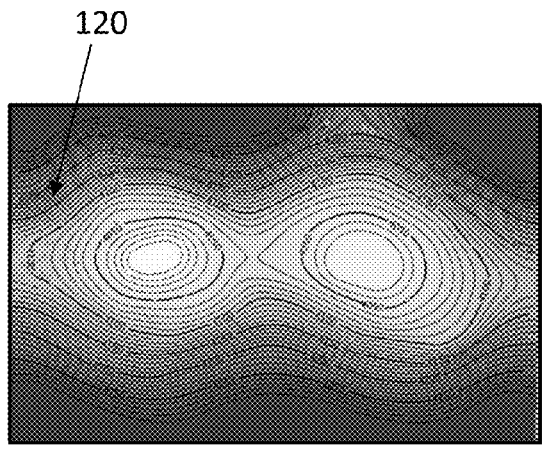
Figure 13:
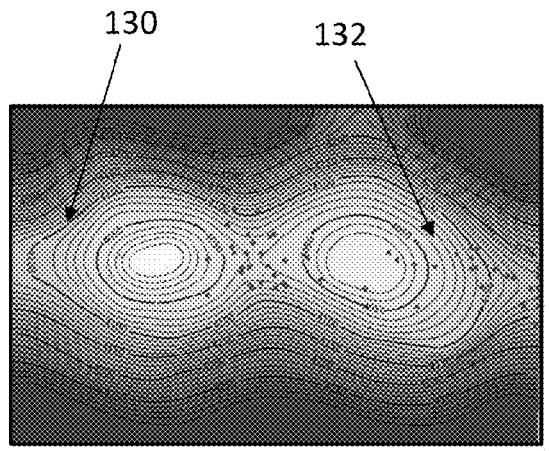
Figure 14:
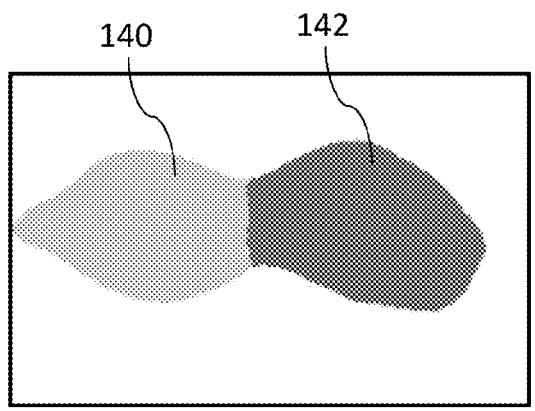
Figure 15:
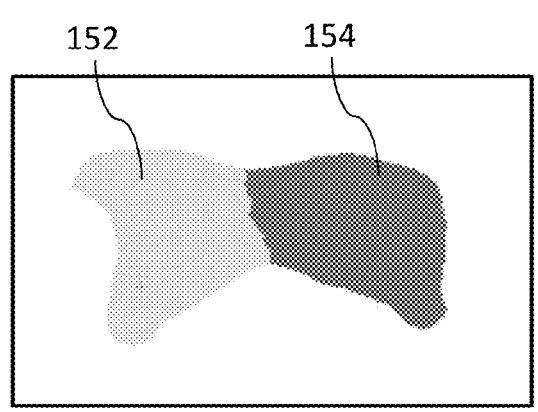
Figure 16:
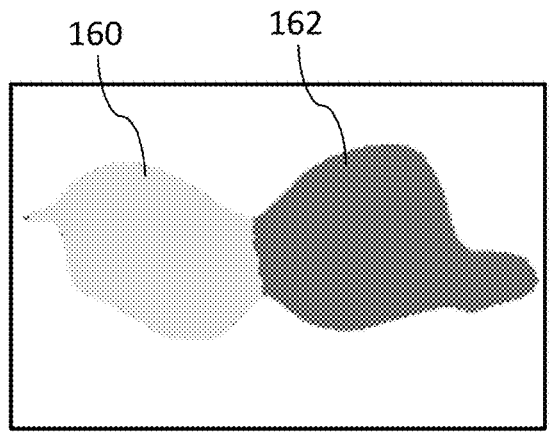
Figure 17:
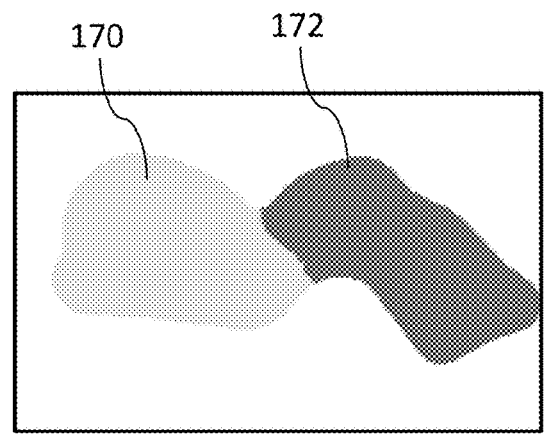
Figure 18:
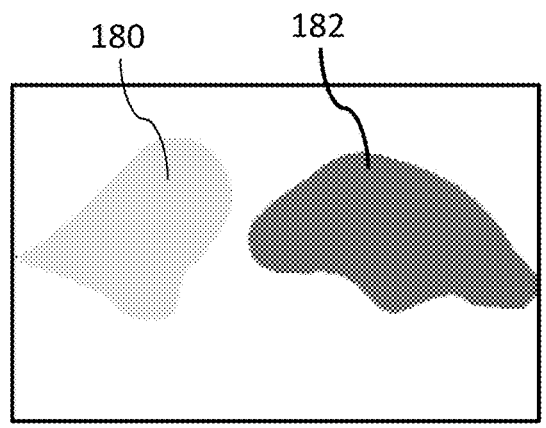
Figure 19:
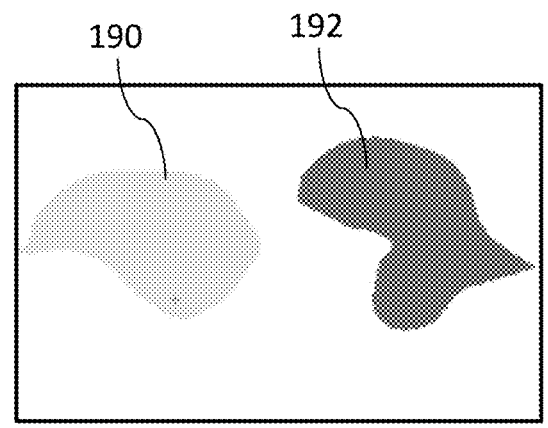

FIGS. 10 to 13 also illustrate uncertain and different representations of the same characteristic point of the top surface which are determined in examples of the method. FIG. 10 shows uncertain local tops 100 and 102. FIG. 11 shows an uncertain saddle 110. FIG. 12 show an uncertain spill 120. FIG. 13 shows uncertain individual spills 130 and 132.

The method may comprise estimating the real world location of one or more characteristic points of the top surface based on uncertain and different determined representations of each point. For example, for one or more characteristic points (e.g. a saddle, a spill, an individual spill or a local top), the method may comprise estimating the location of the characteristic point by using (e.g. all the) uncertain and different representations of the characteristic point. Using all these different representations allows to estimate the location of the characteristic point with accuracy and robustness.

The method may additionally or alternatively comprise, for one or more determined saddles, determining whether the saddle corresponds to a leak connection between two culminations. The determining may be carried out based on the position and/or the depth of the saddle and/or of one or more other characteristic point (e.g. one or more individual or global spill(s)) determined by the method.

In examples, the method further comprises performing, based on one or more cells determined for at least one provided geological mesh, a segmentation of the trap into respective parts each associated with a respective culmination of the trap. These examples are now discussed.

In these examples, by "based on one or more cells determined for at least one provided geological mesh", it is to be understood the following: the method determines one or more cells each of a respective geological mesh corresponding to a saddle, and the method uses at least a part of these determined cells for performing the segmentation. For example, the method may use all cells determined for a single geological mesh for performing the segmentation. Additionally or alternatively, the method may use several cells each of a different geological mesh and each being a different and uncertain representation of a same saddle of the top surface. In any case, this amounts to say that the method uses (e.g. all) determined locations of one or more saddles to perform the segmentation.

Performing a segmentation of the trap into respective parts (i.e. of the trap) each associated with a respective culmination means dividing (e.g. partitioning) the trap into these respective parts. Each respective part is associated with a respective culmination, which means that each respective part corresponds or substantially corresponds to a part of the trap that is comprised between the culmination and the base surface. Performing the segmentation may comprise determining the respective parts by estimating the shape, the size and/or the depth of each said respective culmination and/or of each said respective part. Estimating the shape may be carried out by using determined locations of one or more saddles as previously discussed. Where the method also determines locations of one or more local tops, spill and/or individual spill(s), estimating the shape may be carried out by using also these locations. It is also to be understood that the segmentation may be performed for each provided geological mesh, that is the respective parts are determined on each geological mesh. Where there are two or more geological meshes all within the range of uncertainty as previously discussed, the segmentation may yield different results for each geological mesh as illustrated by FIGS. 14 to 19, which are now discussed.

FIGS. 14 to 19 illustrate examples of a segmentation performed by the method for different realizations of the top surface. Due to top surface uncertainties, as previously discussed, the results of the segmentation differ from one realization to the other. For the realization shown in FIG. 14, the segmentation yields two respective parts associated with two respective culminations 140 and 142. The culminations are connected by a leak connection determined by the method. For the realization shown in FIG. 15, the segmentation yields two respective parts associated with two respective culminations 150 and 152. The culminations are connected by a leak connection determined by the method. For the realization shown in FIG. 16, the segmentation yields two respective parts associated with two respective culminations 160 and 162. The culminations are connected by a leak connection determined by the method. For the realization shown in FIG. 17, the segmentation yields two respective parts associated with two respective culminations 170 and 172. The culminations are connected by a leak connection determined by the method. For the realization shown in FIG. 18, the segmentation yields two respective parts associated with two respective culminations 180 and 182. The culminations are not connected. For the realization shown in FIG. 19, the segmentation yields two respective parts associated with two respective culminations 190 and 192. The culminations are not connected. FIGS. 14 to 19 illustrate effects of to surface uncertainties: the results of the segmentation vary from one realization to the other.

In examples, the method further comprises performing, based on one or more cells determined for at least one provided geological mesh, a fluid contact simulation. These examples are now discussed.

In these examples, by "based on one or more cells determined for at least one provided geological mesh", it is to be understood the following: the method determines one or more cells each of a respective geological mesh corresponding to a saddle, and the method uses at least a part of these determined cells for performing the fluid contact simulation. For example, the method may use all cells determined for a single geological mesh for performing the fluid contact simulation. Additionally or alternatively, the method may use several cells each of a different geological mesh and each being a different and uncertain representation of a same saddle of the top surface. In any case, this amounts to say that the method uses (e.g. all) determined locations of one or more saddles to perform the fluid contact simulation.

As known per se from the field of geology, a fluid contact is a surface (e.g. planar or considered planar) within a respective part associated with a respective culmination of the trap. The plan surface may correspond to a contact between a water impregnated area and an oil impregnated area, or between a water impregnated area and a gas impregnated area, or between an oil impregnated area and a gas impregnated area. By "performing a fluid contact simulation", it is meant the following: for at least one couple of respective culminations connected by a determined saddle that is a leak connection, simulating/computing the relative positioning of the respective fluid contacts in each culmination of the couple. The simulating is based on the saddle between the culminations and may additionally be based on other characteristic points determined by the method, such as another saddle, a global spill, one or more individual spill(s) each of a respective culmination of the couple and/or the local tops of each culmination of the couple. The simulation allows, knowing hydrocarbon trajectories, to determine repartition and/or volumes within the trap consistent with hydrocarbon leakage between culminations.

Figure 20:
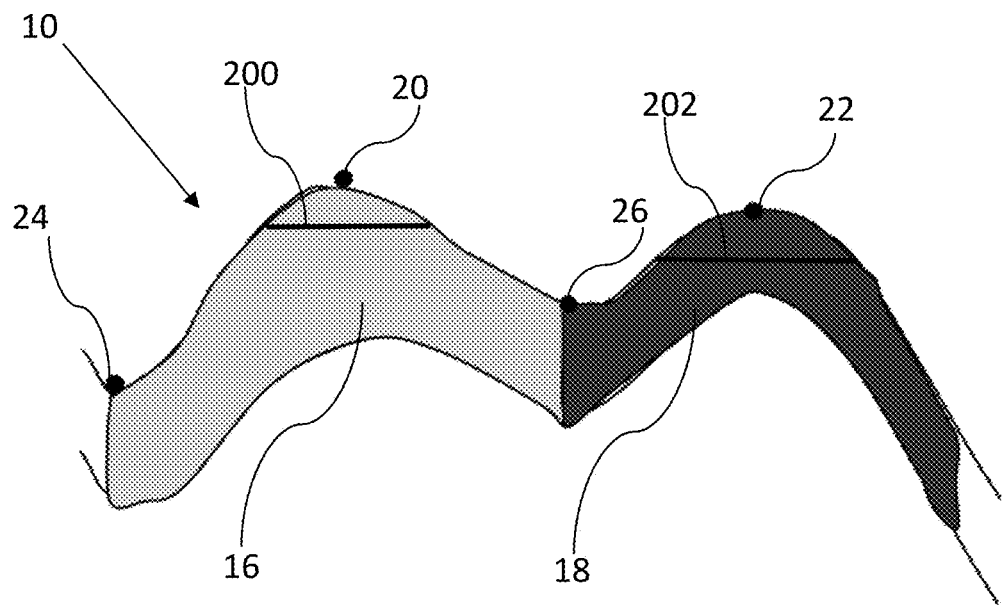

An example of the performing of a fluid contact simulation is now discussed with respect to FIG. 20. The simulation illustrated in FIG. 20 may be referred to as a "leakoff control". The simulation is performed on the reservoir 10 which is the one of FIG. 2, previously described. The simulation comprises the following steps:
 select randomly one segment among segment 200, representing a fluid contact in culmination 16, and segment 202, representing a fluid contact in culmination 18;
 simulate the position/value of the selected segment between a local top (either 20 or 22) and the spill 24;
 if the simulated position/value of the selected segment is above the saddle 26, simulate the position/value of the other segment between the other local top (either 22 or 20) and the saddle 26;
 if the simulated position/value of the selected segment is below the saddle 26, the position/value of the other segment is identical.

Figure 21:
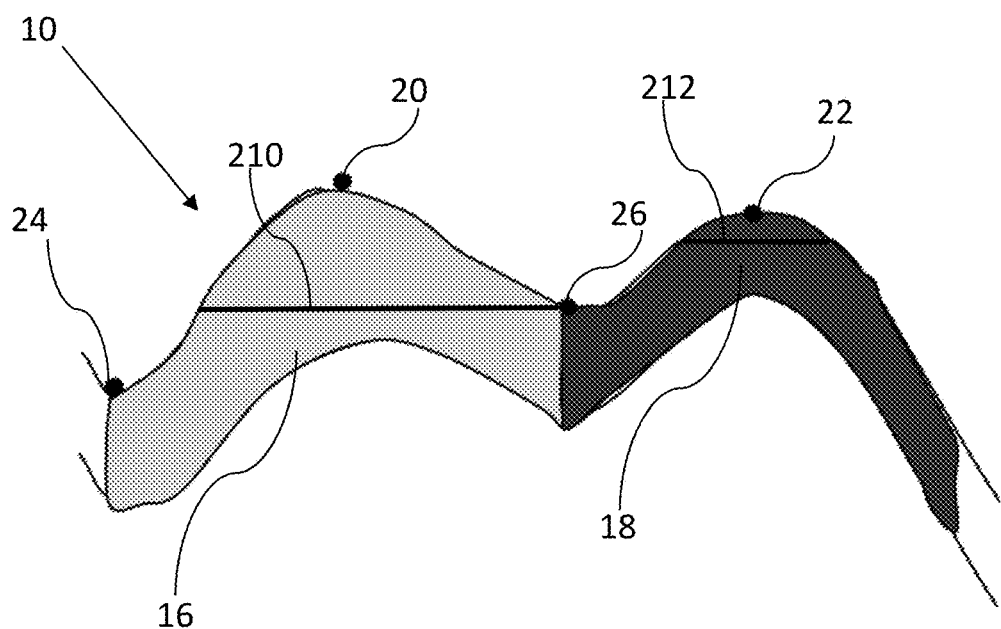

Another example of the performing of a fluid contact simulation is now discussed with respect to FIG. 21. The simulation illustrated in FIG. 21 may be referred to as a "charge control". The simulation is performed on the reservoir 10 which is the one of FIG. 2, previously described. The simulation performs the following steps:
 select among segment 210, representing a fluid contact in culmination 16, and segment 222, representing a fluid contact in culmination 18, the segment closer to the source rock. Here segment 210 is selected;
 simulate the position/value of the selected segment 210 between the local top 20 and the spill 24;
 if the simulated position/value of the selected segment is above the saddle 26, simulate the position/value of the other segment 212 between the selected segment 210 and the other top 22;
 if the simulated position/value of the selected segment 210 is below the saddle 26, the position/value of the other segment 212 is identical.

As previously discussed, the method determines one or more saddles of the trap, in examples by estimating the location of each saddle based on different and uncertain locations of it as determined by the method. In other words, the method outputs specifications each respective to a determined saddle's location, such as the saddle's position and/or depth. As previously discussed, the method may also output specifications each respective to one or more determined characteristic points of the top surface, such as local tops of culminations and/or global or individual spill(s), in examples by estimating the locations of these characteristics points based on their previously-discussed different and uncertain locations as determined by the method. In examples, the method may also output fluid contact simulation results and/or one or more segmentations of the trap.

The one or more saddle's specifications and the other possible outputs of the method which have been discussed hereinabove each form objective physical information based on which hydrocarbon prospection/exploration and/or production decision may be taken.

The method may notably be integrated in a hydrocarbon production process which may comprise taking one or more hydrocarbon prospection/exploration and/or production decisions based on outputs of the method. The one or more hydrocarbon prospection/exploration and/or production decisions may comprise selecting one or more locations on the top surface (e.g. one or more local tops) each for drilling a production well or an exploration well reaching the trap. The hydrocarbon production process may additionally or alternatively comprise performing one or more physical actions based on outputs of the method and/or on the one or more hydrocarbon prospection/exploration and/or production decisions. For example, the performing of the one or more physical actions may be performed according to the one or more hydrocarbon prospection/exploration and/or production decisions, e.g. by implementing the one or more hydrocarbon prospection/exploration and/or production decisions. The one or more physical actions may comprise drilling one or more exploration or production wells, e.g. each at a respective one of said selected one or more locations. Thanks to the algorithm, the hydrocarbon production process may follow an optimal well drilling strategy.

The method may be used in the following context. On the basis of a seismic acquisition campaign (measurement of the responses of the subsoil to the vibrations imposed on it), it is possible to identify seismic reflectors and point them to define surfaces. From these sets of surfaces, geometries that are potential traps for hydrocarbons are defined. The volumetrics of these traps depends on the uncertainties on the defined surfaces and the detection of the characteristic points of these surfaces: tops (also referred to as "structural tops"), filling limits or "spills" and finally the necks also called saddles points, or just saddles. The strategy of siting wells to discover and produce the reservoir largely depends on some of these characteristic points, including the saddles.

In this context, method provides a general framework where it is possible to deal with the case of complex surfaces presenting several important culminations and where each of which is able to inherit a top. The culminations can have their own spill in which case they do not communicate. They can also communicate by saddles which are then "leak connections", in which case they have a common spill. The method applies to a chosen number of culminations which may be greater than two.

The method is computer-implemented. This means that steps (or substantially all the steps) of the method are executed by at least one computer, or any system alike. Thus, steps of the method are performed by the computer, possibly fully automatically, or, semi-automatically. In examples, the triggering of at least some of the steps of the method may be performed through user-computer interaction. The level of user-computer interaction required may depend on the level of automatism foreseen and put in balance with the need to implement user's wishes. In examples, this level may be user-defined and/or pre-defined.

A typical example of computer-implementation of a method is to perform the method with a system adapted for this purpose. The system may comprise a processor coupled to a memory and a graphical user interface (GUI), the memory having recorded thereon a computer program comprising instructions for performing the method. The memory may also store a database. The memory is any hardware adapted for such storage, possibly comprising several physical distinct parts (e.g. one for the program, and possibly one for the database).

Figure 22:
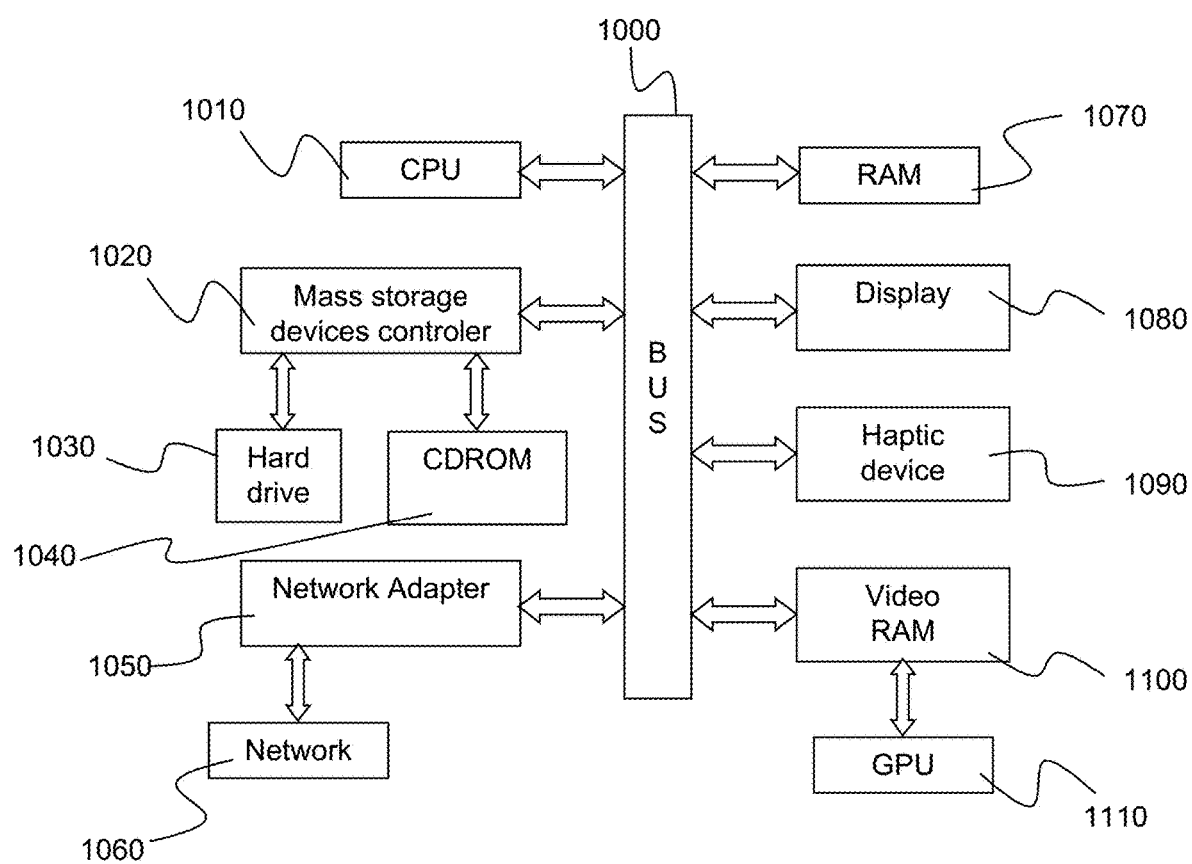

FIG. 22 shows an example of the system, wherein the system is a client computer system, e.g. a workstation of a user.

The client computer of the example comprises a central processing unit (CPU) 1010 connected to an internal communication BUS 1000, a random access memory (RAM) 1070 also connected to the BUS. The client computer is further provided with a graphical processing unit (GPU) 1110 which is associated with a video random access memory 1100 connected to the BUS. Video RAM 1100 is also known in the art as frame buffer. A mass storage device controller 1020 manages accesses to a mass memory device, such as hard drive 1030. Mass memory devices suitable for tangibly embodying computer program instructions and data include all forms of nonvolatile memory, including by way of example semiconductor memory devices, such as EPROM, EEPROM, and flash memory devices; magnetic disks such as internal hard disks and removable disks; magneto-optical disks; and CD-ROM disks 1040. Any of the foregoing may be supplemented by, or incorporated in, specially designed ASICs (application-specific integrated circuits). A network adapter 1050 manages accesses to a network 1060. The client computer may also include a haptic device 1090 such as cursor control device, a keyboard or the like. A cursor control device is used in the client computer to permit the user to selectively position a cursor at any desired location on display 1080. In addition, the cursor control device allows the user to select various commands, and input control signals. The cursor control device includes a number of signal generation devices for input control signals to system. Typically, a cursor control device may be a mouse, the button of the mouse being used to generate the signals. Alternatively or additionally, the client computer system may comprise a sensitive pad, and/or a sensitive screen.

The computer program may comprise instructions executable by a computer, the instructions comprising means for causing the above system to perform the method. The program may be recordable on any data storage medium, including the memory of the system. The program may for example be implemented in digital electronic circuitry, or in computer hardware, firmware, software, or in combinations of them. The program may be implemented as an apparatus, for example a product tangibly embodied in a machine-readable storage device for execution by a programmable processor. Method steps may be performed by a programmable processor executing a program of instructions to perform functions of the method by operating on input data and generating output. The processor may thus be programmable and coupled to receive data and instructions from, and to transmit data and instructions to, a data storage system, at least one input device, and at least one output device. The application program may be implemented in a high-level procedural or object-oriented programming language, or in assembly or machine language if desired. In any case, the language may be a compiled or interpreted language. The program may be a full installation program or an update program. Application of the program on the system results in any case in instructions for performing the method.

The teachings of all patents, published applications and references cited herein are incorporated by reference in their entirety.

While example embodiments have been particularly shown and described, it will be understood by those skilled in the art that various changes in form and details may be made therein without departing from the scope of the embodiments encompassed by the appended claims.

What is claimed is:

1. A computer-implemented method for analyzing a hydrocarbon trap in hydrocarbon production, the hydrocarbon trap having a top surface, the computer-implemented method comprising:
   providing one or more geological meshes, each geological mesh representing the top surface, each geological mesh having cells, each cell representing a location on the top surface, wherein each geological mesh comprises depth values, each depth value at a cell, and each depth value representing a depth of the location represented by the cell;
   for each geological mesh, determining one or more cells on the geological mesh, each determined cell corresponding to a local maximum of the depth values, wherein determining the one or more cells comprises:
   (i) providing two or more top cells on the geological mesh, each top cell representing a top of a respective culmination of the hydrocarbon trap and (ii) performing multiple propagations on the geological mesh, each propagation starting at a respective top cell and being performed according to a propagation criterion that rewards depth value smallness, wherein each determined cell corresponds to a respective saddle of the hydrocarbon trap representing a real-world location of the respective saddle; and
   based on the determined one or more cells, causing one or more physical actions in the hydrocarbon production at a given the real-world location of a given the respective saddle.

2. The computer-implemented method of claim 1, wherein each determined cell corresponds to an encounter between at least two propagations.

3. The computer-implemented method of claim 1, wherein each propagation is a spill-detection propagation.

4. The computer-implemented method of claim 1, wherein providing the two or more top cells comprises:
   providing two or more starting cells on the geological mesh, each starting cell representing a location within a respective culmination of the hydrocarbon trap; and
   performing multiple initial propagations on the geological mesh, each initial propagation starting at a respective starting cell and being performed according to the propagation criterion that rewards depth value smallness.

5. The computer-implemented method of claim 1, wherein the determined one or more cells consists in at least two cells.

6. The computer-implemented method of claim 1, wherein each geological mesh stems from seismic measurements of the hydrocarbon trap.

7. The computer-implemented method of claim 1, wherein the provided one or more geological meshes comprise two or more geological meshes forming different representations of the top surface within a range of uncertainty.

8. The computer-implemented method of claim 1 further comprising:
performing, based on the one or more cells determined, a segmentation of the hydrocarbon trap into respective parts, each part associated with a given respective culmination of the hydrocarbon trap.

9. The computer-implemented method of claim 1, wherein the method further comprising:
performing, based on the one or more cells determined, a fluid contact simulation.

10. A non-transitory computer-readable data storage medium comprising:
a memory area having recorded thereon computer program instructions for performing a hydrocarbon production analysis of a hydrocarbon trap having a top surface, the computer program instructions including instructions to:
provide one or more geological meshes, each geological mesh representing the top surface, each geological mesh having cells, each cell representing a location on the top surface, wherein each geological mesh comprises depth values, each depth value at a cell, and each depth value representing a depth of the location represented by the cell;
for each geological mesh, determine one or more cells on the geological mesh, each determined cell corresponding to a local maximum of the depth values, wherein determining the one or more cells comprises: (i) providing two or more top cells on the geological mesh, each top cell representing a top of a respective culmination of the hydrocarbon trap and (ii) performing multiple propagations on the geological mesh, each propagation starting at a respective top cell and being performed according to a propagation criterion that rewards depth value smallness, wherein each determined cell corresponds to a respective saddle of the hydrocarbon trap representing a real-world location of the respective saddle; and
based on the determined one or more cells, cause one or more physical actions in hydrocarbon production at a given real-world location of a given respective saddle.

11. The non-transitory computer-readable data storage medium of claim 10, wherein each determined cell corresponds to an encounter between at least two propagations.

12. The non-transitory computer-readable data storage medium of claim 10, wherein each propagation is a spill-detection propagation.

13. A system comprising:
a processor coupled to a memory and a graphical user interface, the memory having recorded thereon a computer program comprising instructions for analyzing a hydrocarbon trap in hydrocarbon production, the hydrocarbon trap having a top surface, the analyzing including:
providing one or more geological meshes, each geological mesh representing the top surface, each geological mesh having cells, each cell representing a location on the top surface, wherein each geological mesh comprises depth values, each depth value at a cell, and each depth value representing a depth of the location represented by the cell;
for each geological mesh, determining one or more cells on the geological mesh, each determined cell corresponding to a local maximum of the depth values, wherein determining the one or more cells comprises: (i) providing two or more top cells on the geological mesh, each top cell representing a top of a respective culmination of the hydrocarbon trap and (ii) performing multiple propagations on the geological mesh, each propagation starting at a respective top cell and being performed according to a propagation criterion that rewards depth value smallness, wherein each determined cell corresponds to a respective saddle of the hydrocarbon trap representing a real-world location of the respective saddle; and
based on the determined one or more cells, causing one or more physical actions in the hydrocarbon production at a given real-world location of a given respective saddle.

14. The system of claim 13, wherein each determined cell corresponds to an encounter between at least two propagations.

* * * * *

UNITED STATES PATENT AND TRADEMARK OFFICE
CERTIFICATE OF CORRECTION

| | | |
|---|---|---|
| PATENT NO. | : 11,846,743 B2 | |
| APPLICATION NO. | : 17/333321 | |
| DATED | : December 19, 2023 | |
| INVENTOR(S) | : Pierre Biver and Natalia Shchukina | |

It is certified that error appears in the above-identified patent and that said Letters Patent is hereby corrected as shown below:

In the Claims

In Claim 9, Column 17, Line 19, please delete "wherein the method".

Signed and Sealed this
Thirteenth Day of February, 2024

Katherine Kelly Vidal
*Director of the United States Patent and Trademark Office*